H. H. HOUGHTON.
VALVED COUPLING FOR LUBRICATORS.
APPLICATION FILED JAN. 17, 1920.
1,342,678.
Patented June 8, 1920.
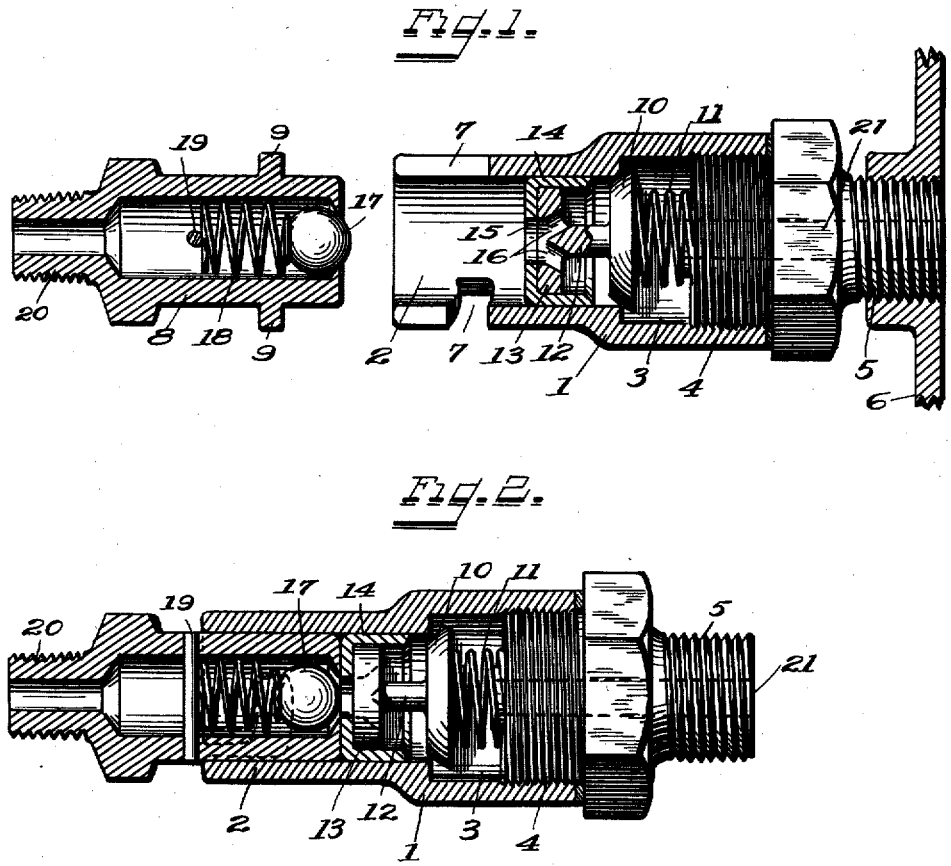
Inventor.
Herbert H. Houghton
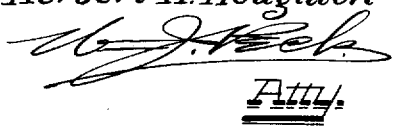
Atty.

UNITED STATES PATENT OFFICE.

HERBERT H. HOUGHTON, OF FILER, IDAHO.

VALVED COUPLING FOR LUBRICATORS.

1,342,678.              Specification of Letters Patent.         Patented June 8, 1920.

Application filed January 17, 1920. Serial No. 351,984.

*To all whom it may concern:*

Be it known that I, HERBERT H. HOUGHTON, a citizen of the United States, and a resident of Filer, in the county of Twin Falls and State of Idaho, have invented certain new and useful Improvements in Valved Couplings for Lubricators, of which the following is a full, clear, and exact description, reference being had to the accompanying drawing, forming part of this specification.

My invention relates primarily to that class of devices which are intended to be used in connection with the filling or charging of grease cups for automobiles and other machinery wherein the lubricant is supplied under pressure to the end that proper lubrication of the bearing will be insured.

One object of my invention is to provide means whereby the pressure on the supply of lubricant may be maintained whether the connection to the grease cup is established for the transfer of lubricant or whether the device is disconnected from the grease cup.

Another object of my invention is the provision of means for sealing the joint between the grease cup and the supplying connection to the end that all of the lubricant handled by the device will be maintained either in the device or transferred to the grease cup without loss by leakage with its consequent ill effects both to the hands and apparel of the user and to the appearance of the machine.

Another object of my invention is the provision of a structure which may be used directly upon a compression grease gun or upon the end of a flexible or other lubricant conduit.

Other objects of my invention will appear and be described in the specification.

The novelty of my invention will be hereinafter more fully set forth and specifically pointed out in the claims.

In the accompanying drawing;

Figure 1 is a sectional elevation of a device embodying my invention adjacent to a grease cup adapted to be supplied with lubricant.

Fig. 2 is a sectional elevation of the parts shown in Fig. 1, the supplying connection being shown engaged with the grease cup or lubricant receiving member and the lubricant transfer passages opened.

The same numerals of reference are used to indicate identical parts in all the figures.

For the purpose of illustration to show one form of mechanism in which my invention may be embodied, I have shown a member which I will call a connection and designate by the numeral 1. This connection comprises a cylindrical portion 2 and a second larger cylindrical portion 3 which is threaded to receive the end of a plug 4, the other end of which as shown at 5 is adapted to be either connected to the head 6 of an ordinary compression grease gun, or to any other form of lubricant supplying conduit. The cylindrical portion 2 of the connection 1 is provided with cam acting slots 7 which are somewhat in the form of a bayonet joint by means of which the connection 1 may be secured to any suitable grease cup 8 which is provided with lugs 9 which co-act with the slots 7 for purposes to be presently described.

A valve 10 is mounted at the juncture of the portions 2 and 3 of the connection 1 and is normally held upon its seat by any suitable spring 11, the valve carrying an extension 12 which carries a head 13 upon which a cup leather 14 is mounted, the cup leather fitting within the bore of the cylindrical portion 2. The cup leather 14 has a central opening 15 and communicates with lubricant passages 16 which extend through the head 13.

The grease cup 8 is preferably provided with a ball check valve 17, held to its seat by a spring 18 which bears against the pin 19, the construction being such that the ball valve 17 may be opened, as shown in Fig. 2, by the pressure of the lubricant which is forced into the grease cup, the opposite end of the grease cup being threaded as at 20 to serve as a means for attachment to the machinery which it is desired to lubricate.

The operation of the device is as follows, assuming the parts to be in the position shown in Fig. 1 and assuming that lubricant under pressure is supplied to the portion 3 of connection 1 through any suitable conduit 21 in the plug 4, and also assuming that the grease cup is attached to a bearing or other part of machinery which it is desired to lubricate. By placing the connection 1 over the grease cup 8 and causing the lugs 9 to enter the slots 7, the parts may be brought nearly to the position shown in Fig. 2 whereupon by turning the connection 1 with relation to the grease cup 8, the cam portion of the slots 7 become effective to force the cup leather 14 against the end of the grease cup and move the valve 10 from its seat whereupon the pressure upon the lubricant causes a flow past the valve 10 through the passage 16 and opening 15, forcing the ball valve 17 from its seat and transferring a quantity of lubricant to the cup 8, the relative positions of the parts just described is such that when the lugs 9 begin to enter the cam portion of the slots 7, the end of the grease cup or lubricant receiving member 8 just comes in contact with the cup leather 14, and that when the connection 1 is turned to cause the lugs to travel in the cam portion of the slots 7, sufficient movement between the parts is produced to force the cup leather and the parts which carry it as well as the valve 10 toward the plug 4 thus raising the valve from its seat as shown in Fig. 2.

It is to be observed that the pressure of the lubricant as it fills the space between the discharge side of the valve 10 and the end of the receiving member 8 becomes effective on the inner diameter of the cylindrical portion of the cup leather 14 to expand the leather and cause it to seal the passage through the device against leakage at the outer wall of the cylindrical portion 2, and also that the face of the cup leather acts as a seal for the joint between the end of the lubricant receiving member 8 and the lubricant passage so that all of the lubricant which passes through the device is forced to enter the lubricant receiving member, the outside of the lubricant receiving member and the inside of the cylindrical portion 2 of the connection 1 which embraces the lubricant receiving member are maintained dry and free from lubricant, the only exposed portion upon which any of the transferred lubricant may remain being that portion of the ball check valve 17 which projects from the member 8 when the ball valve is seated.

To stop the flow of the lubricant through the device it is only necessary to reverse the previously described method of connecting the parts together, whereupon the valve 10 will become seated and the ball check valve 17 will also be forced to its seat.

It is to be observed that the pressure exerted upon the supply of lubricant may be maintained without danger of the loss of any of the lubricant with the result that the operator may connect or disconnect the device from the lubricant receiving member wiithout the necessity of varying the pressure on his supply of lubricant thereby effecting a material saving in the time necessary to properly lubricate any kind of machine, such as would be consumed were it necessary to first establish the connection to the lubricant supply, then apply the pressure for the transfer, then release the pressure, and then disconnect the device.

Having thus fully described my invention, I claim:

1. In a lubricator the combination of a lubricant receiving member, a lubricant delivery connection, a pressure retaining valve in said connection, means coöperating between said connection and said receiving member whereby said connection may be attached to said member, and means coöperating between said valve and said receiving member whereby when said connection is attached to said receiving member said valve will be opened to permit the passage of lubricant into the receiving member, and a seal for the joint between the receiving member and the connection.

2. In a lubricator the combination of a lubricant receiving member provided with means for attachment to machinery, a lubricant transfer connection, a pressure maintaining valve in said connection, means coöperating between said connection and said lubricant receiving member whereby said connection may be attached thereto, means coöperating between the end of the lubricant receiving member and the pressure retaining valve for opening the latter when the connection is attached to the lubricant receiving member, a seal coöperating with the valve operating means to seal the joint between the lubricant receiving member and the connection when the valve is open, and a check valve for retaining the lubricant in the lubricant receiving member.

3. In a lubricator the combination of a lubricant receiving member provided with a check valve, a lubricant transferring connection adapted to receive a portion of the lubricant receiving member, a pressure retaining valve in the connection, means for normally holding said valve to its seat, and means coöperating with a portion of the lubricant receiving member and the valve for opening the valve in the connection, said means comprising in part a seal for the joint between the connection and the lubricant receiving member whereby lubricant will be transferred to the receiving member under pressure.

4. In a lubricator the combination of a connection for supplying lubricant under pressure, a pressure retaining valve in said connection, means for normally holding said valve to its seat, a valve opening head, a lubricant passage through said head, a seal carried by said head and provided with a lubricant passage therethrough, a lubricant receiving member provided with a check valve, coöperating connections between said receiving member and said connection for supplying lubricant under pressure whereby said connection may be attached to said receiving member and whereby when said connection is attached to said receiving member a portion of the latter comes in contact with the seal carried by the valve opening head and moves the seal to seal the joint between the connection and the receiving member and opens the valve to permit the transfer of lubricant under pressure to the receiving member.

5. In a lubricator the combination of a lubricant transfer connection, means for supplying lubricant thereto under pressure, a pressure retaining valve in said connection, means for normally holding said valve to its seat, a valve opening head, a seal carried thereby, a lubricant passage through said seal and head, a lubricant receiving member, a check valve in said member, a cam acting joint between said receiving member and said transfer connection whereby when said transfer connection is attached to said receiving member the cam portion of the joint will compress the seal to seal the joint between the parts and open the valve to permit a transfer of lubricant under pressure to the receiving member and whereby when the parts are disconnected the lubricant so transferred will remain in the receiving member and the valve in the transferring connection will be closed.

HERBERT H. HOUGHTON.